United States Patent
Ikegawa

(10) Patent No.: US 7,630,096 B2
(45) Date of Patent: Dec. 8, 2009

(54) IMAGE PROCESSING APPARATUS, IMAGE PROCESSING METHOD, IMAGE FORMING APPARATUS, IMAGE FORMING METHOD, COMPUTER PROGRAM AND COMPUTER-READABLE STORAGE MEDIUM

(75) Inventor: Yoshiharu Ikegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1013 days.

(21) Appl. No.: 10/787,304

(22) Filed: Feb. 27, 2004

(65) Prior Publication Data

US 2004/0196474 A1    Oct. 7, 2004

(51) Int. Cl.
G06K 15/00 (2006.01)
H04N 1/60 (2006.01)
G06F 3/00 (2006.01)

(52) U.S. Cl. .................... 358/1.18; 358/1.16; 358/1.17; 358/1.9; 710/56

(58) Field of Classification Search .................. 358/1.8, 358/1.9, 1.16, 1.15, 1.11, 1.17, 515, 517, 358/426.01; 710/32; 382/162, 167, 232; 345/604, 549, 600, 606, 523, 524; 347/37, 347/9

See application file for complete search history.

(56) References Cited

U.S. PATENT DOCUMENTS

| | | | | |
|---|---|---|---|---|
| 5,737,503 A | * | 4/1998 | Mitani | 358/1.16 |
| 6,219,149 B1 | * | 4/2001 | Kawata et al. | 358/1.15 |
| 6,529,289 B1 | * | 3/2003 | Konno et al. | 358/1.17 |
| 6,538,764 B2 | * | 3/2003 | Ueda | 358/1.16 |
| 6,891,638 B1 | * | 5/2005 | Iizumi et al. | 358/1.9 |
| 7,023,579 B2 | * | 4/2006 | Toda | 358/1.9 |

* cited by examiner

Primary Examiner—King Y Poon
Assistant Examiner—Neil R McLean
(74) Attorney, Agent, or Firm—Fitzpatrick, Cella, Harper & Scinto

(57) ABSTRACT

An image processing apparatus which reduces memory requirements of a printer and realizes high-speed printing is provided for a color image forming apparatus having a plurality of image forming units, transferring sequentially developed images in color to a recording medium, and forming a color image. In a host computer connected to a printer which has a plurality of image forming units, transfers sequentially developed images in color with overlapping timing to a recording medium, and forms a color image, the CPU converts document data into image data, and transfers the data in the order in which the data is printed in accordance with the delay among the image forming units.

9 Claims, 10 Drawing Sheets

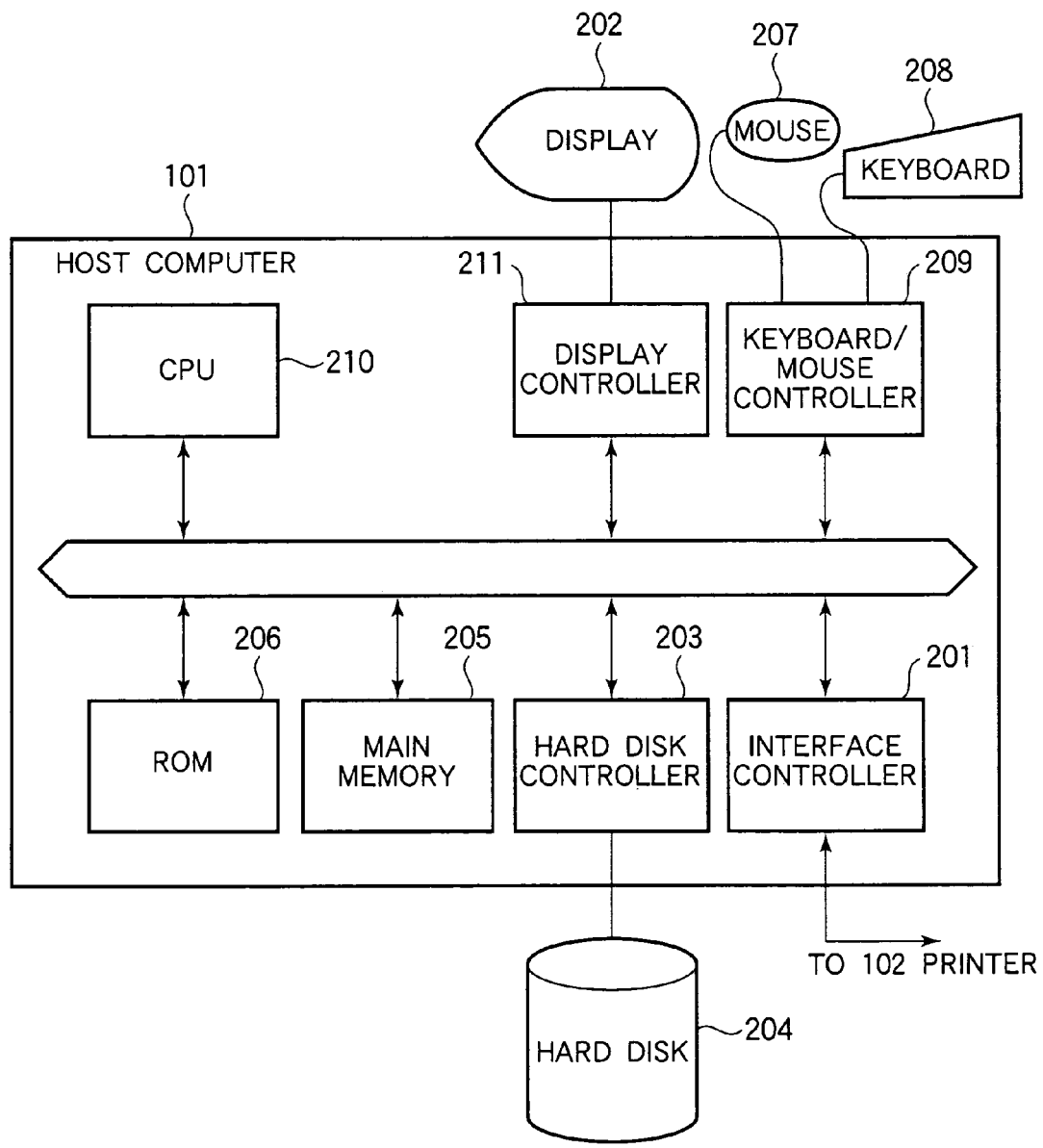

FIG.5

|   | N-TH PAGE | (N+1)TH PAGE | (N+2)TH PAGE |
|---|---|---|---|
| M | 501 502 503 504 | 517 518 519 520 | 533 534 535 536 |
| C | 505 506 507 508 | 521 522 523 524 | 537 538 539 540 |
| Y | 509 510 511 512 | 525 526 527 528 | 541 542 543 544 |
| K | 513 514 515 516 | 529 530 531 532 | 545 546 547 548 |

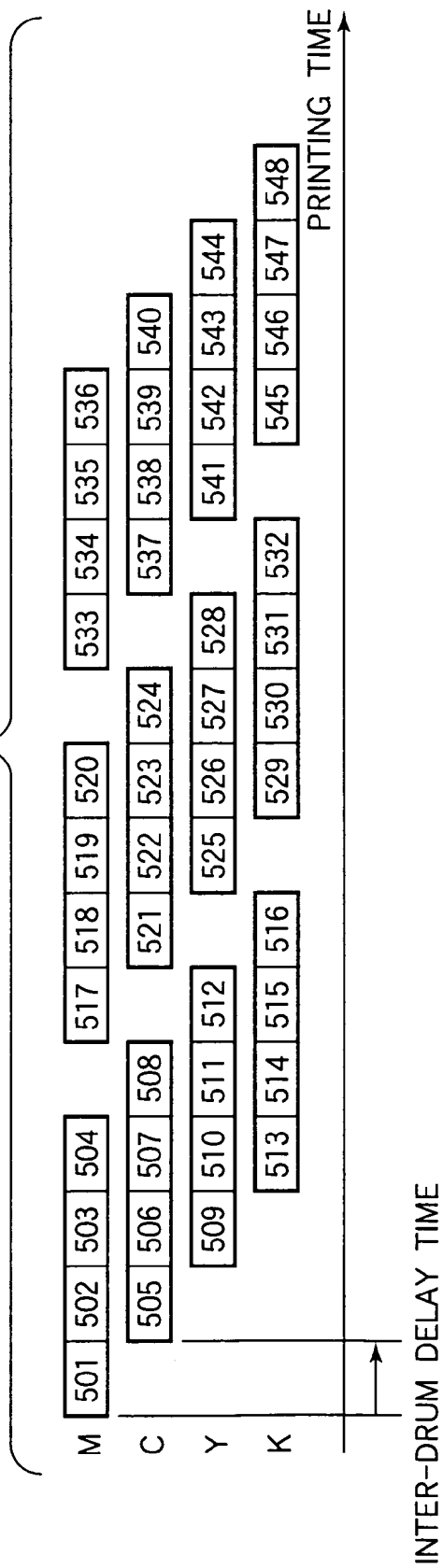

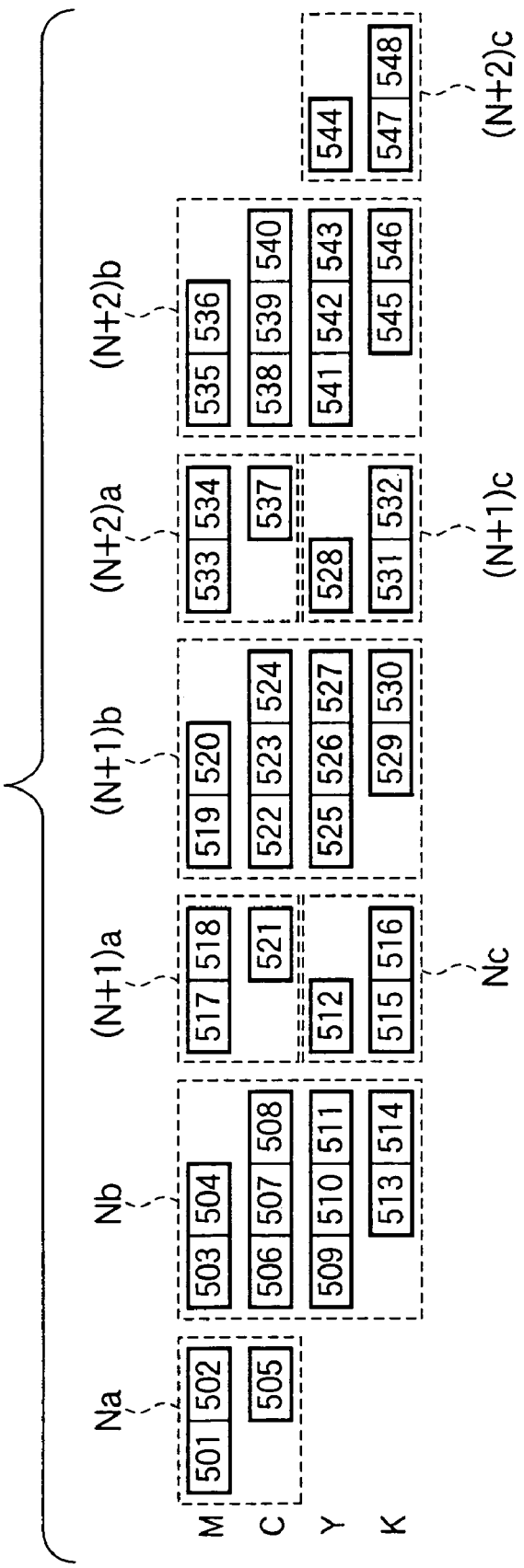

IMAGE PROCESSING APPARATUS, IMAGE PROCESSING METHOD, IMAGE FORMING APPARATUS, IMAGE FORMING METHOD, COMPUTER PROGRAM AND COMPUTER-READABLE STORAGE MEDIUM

BACKGROUND OF THE INVENTION

1. Field of the Invention

The present invention relates to an image processing apparatus, an image processing method, an image forming apparatus, an image forming method, a computer program, and a computer-readable storage medium, and more specifically to a data transmitting process.

2. Related Background Art

Conventionally, in an image forming system configured by a host computer and a color printer, the color printer receives document data from the host computer, converts the received data into image data at the printer side, and forms a color image. The image data has been converted at the printer side because the amount of data to be transferred becomes large, and the transfer speed and a resultant printing speed becomes low if the data is converted at the host computer side. Additionally, a large memory capacity is required at the printer side.

Recently, a printer for quickly outputting a color image such as a laser beam color printer of a 4-drum system having image forming units independently for the YMCK color components. The laser beam color printer of the 4-drum system forms an image with the images of the respective colors YMCK shifted by a time required to feed a printing paper between the respective drums. Furthermore, in the laser beam color printer of the 4-drum system, a page can be printed before the completion of the printing on the previous page, thereby realizing high-speed color printing.

In addition, the throughput of a host computer has been enhanced, a network circuit has become more powerful, and the transfer speed has largely been increased.

SUMMARY OF THE INVENTION

With the background above, the present invention aims at providing an image processing apparatus, an image processing method, an image forming apparatus, an image forming method, a computer program, and a computer-readable storage medium for a color image forming apparatus having a plurality of image forming units, transferring sequentially developed images in color to a recording medium, and forming a color image with the view of reducing the memory requirements of a printer and realizing higher-speed printing.

To attain the above-mentioned objective, the image processing apparatus according to the present invention is connected to a color image forming apparatus having a plurality of image forming units, transferring sequentially developed images in color to a recording medium, and forming a color image, and includes: means for converting document data into image data; and transfer means for transferring the converted image data in the order in which the data is printed on the color image forming apparatus in accordance with the delay among the image forming units of the color image forming apparatus.

The image processing method according to the present invention is a method for use with the device connected to a color image forming apparatus having a plurality of image forming units, transferring sequentially developed images in color to a recording medium, and forming a color image, and includes: a converting step of converting document data into image data; and a transfer step of transferring the image data converted in the converting step in the order in which the data is printed on the color image forming apparatus in accordance with the delay among the image forming units of the color image forming apparatus.

The image forming apparatus according to the present invention is connected to a terminal device over a communications network, has a plurality of image forming units, transfers sequentially developed images in color to a recording medium, and forms a color image, and includes: reception means for receiving image data from the terminal device in the printing order in accordance with the delay among the image forming units; and means for forming an image by sequentially developing an image in color based on the received image data, and transferring the developed image in color to a recording medium.

The image forming method according to the present invention is used with an apparatus which is connected to a terminal device over a communications network, has a plurality of image forming units, transfers sequentially developed images in color to a recording medium, and forms a color image, and includes: a receiving step of receiving image data from the terminal device in the printing order in accordance with the delay among the image forming units; and means for forming an image by sequentially developing an image in color based on the image data received in the receiving step, and transferring the developed image in color to a recording medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows the configuration of a host computer 101;

FIG. 5 shows the concept of dividing image data to be printed in a band unit;

FIG. 6 shows the concept of the order in which the data divided in a band unit is printed;

FIG. 7 shows the concept of dividing image data divided in a band unit into areas;

DESCRIPTION OF THE PREFERRED EMBODIMENTS

Figure 1:
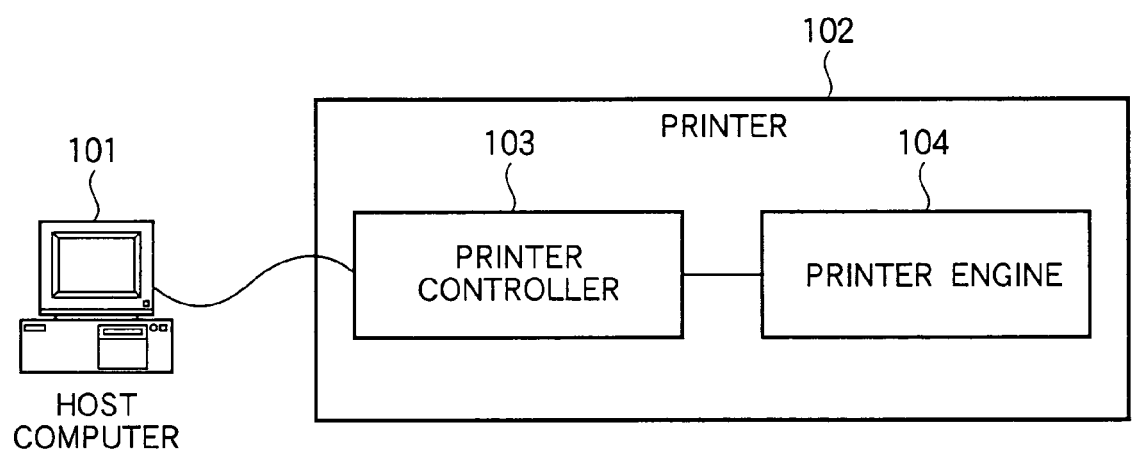
FIG. 1 is a block diagram showing the rough configuration of the printing system.

FIG. 1 is a block diagram showing the rough configuration of the printing system. The outline of the system of the present invention is configured as shown in FIG. 1, and comprises: a host computer 101 which is a processing device of processing an output document; and a printer 102, connected to the host computer, for fixing and printing output information data processed by the host computer on a medium such as paper, etc. The printer 102 is configured by a printer controller 103 and a printer engine 104.

Practically, a user edits an image to be output on the host computer 101, converts the edited data into data for an output image acceptable by the printer 102, and transmits the data to the printer 102. The printer 102 performs printing on paper according to the input data.

FIG. 2 shows the configuration of the host computer 101. The host computer 101 comprises: an I/F controller 201 for communicating data with the printer 102; a CPU 202 for controlling a device; a hard disk controller 203 for temporarily storing image data and storing various data; a hard disk 204; main memory 205; ROM 206; a mouse 207 and a keyboard 208 as user instruction input means; a keyboard/mouse controller 209 for controlling the mouse 207 and the keyboard 208; a display 210 as display means to a user; and a display controller 211 for controlling the display 210.

The ROM 206 stores various pieces of software, for example, the software for handling the page description language, the software for use in performing a compression coding process, etc. The CPU 202 performs various data processing using the software stored in the ROM 206.

Figure 3A:
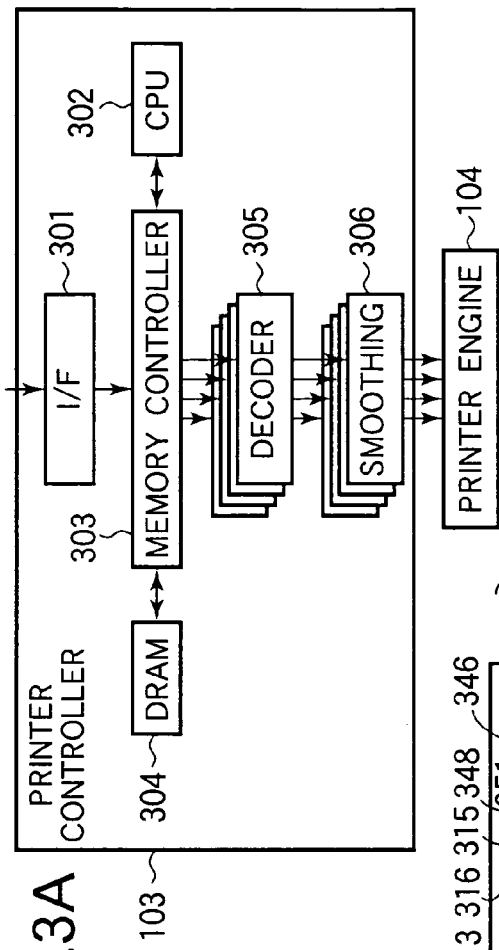
FIG. 3A shows the configuration of a printer controller 103.

FIG. 3A shows the configuration of a printer controller 103. An I/F 301 receives data from data sources such as the host computer 101, and communicates the status, etc. with the host computer 101. Practically, it can be a Centronics interface, a network, etc. but is not limited to those only. A CPU 302 is a control unit for controlling the entire printer device and performs data processing. The ROM and RAM storing a program are contained in the CPU. A memory controller 303 controls DRAM which is a main storage device provided in the printer controller. DRAM 304 stores in memory DRAM which is main storage a work area for the CPU, and the data from the host computer 101.

A decoder 305 is a decoding unit for decompressing received image data, and outputting data while decompressing in real time in synchronization with smoothing 306. Smoothing 306 converts the resolution of drawing image data output through the decoder 305, and, for example, converts the resolution from 600 dpi into 1200 dpi. In the decoder 305 and the smoothing 306, the parallel processing is performed for each color of MCYK.

Figure 3B:
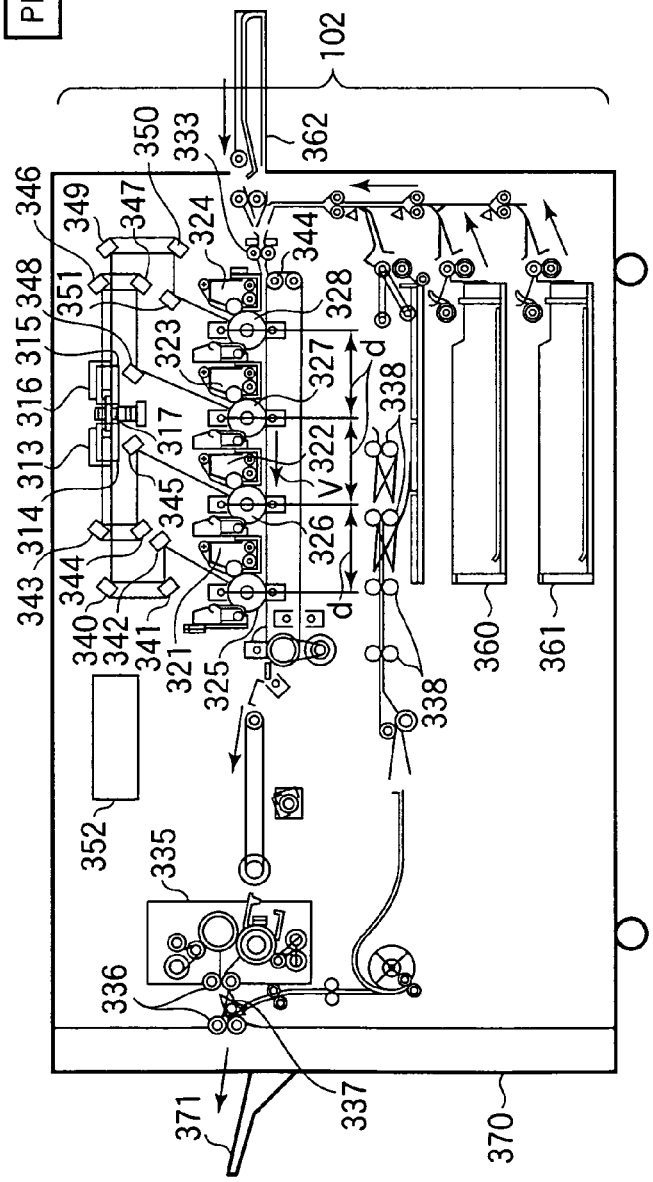
FIG. 3B shows the configuration of a printer engine 104.

FIG. 3B shows the configuration of a printer engine 104.

A printer image processing circuit unit 352 outputs an image signal transmitted from the printer controller 103 to a laser driver via a printer I/F. A laser driver 317 of the printer 102 drives laser emitters 313, 314, 315, and 316, and allows the laser emitters 313, 314, 315, and 316 to emit laser light depending on the output from the printer image processing unit 352.

The laser light irradiates photoconductor drums 325, 326, 327, and 328 through mirrors 340, 341, 342, 343, 344, 345, 346, 347, 348, 349, 350, and 351, and a latent image is formed depending on the laser light on the photoconductor drums 325, 326, 327, and 328. Developing units 321, 322, 323, and 324 develop a latent image using toner of black (Bk), yellow (Y), cyan (C), magenta (M), and the developed toner of each color is transferred to printing paper, thereby performing a printing process.

Printing paper is fed from any of paper cassettes 360 and 361 and a hand-feed tray 362 in synchronization with the start of the irradiation of the laser light, adsorbed to a transfer belt 334 through a resist roller 333, and carried. The developer attached to the photoconductor drums 325, 326, 327, and 328 is transferred to the printing paper. The printing paper with the developer is carried to a fixing unit 335. The developer is fixed to the printing paper by the heat and the pressure of the fixing unit 335. After the printing paper passes through the fixing unit 335, it is ejected by a paper ejection roller 336. A paper ejection unit 370 collects, sorts, and staples the ejected printing paper, and outputs to a tray 371.

When double-side printing is set, the printing paper is carried to the paper ejection roller 336. Then, the rotation of the paper ejection roller 336 is inverted, and a flapper 337 leads the paper to a paper re-feed path 338. The printing paper led to the paper re-feed path 338 is fed to the transfer belt 334 at the timing described above.

Figure 4:
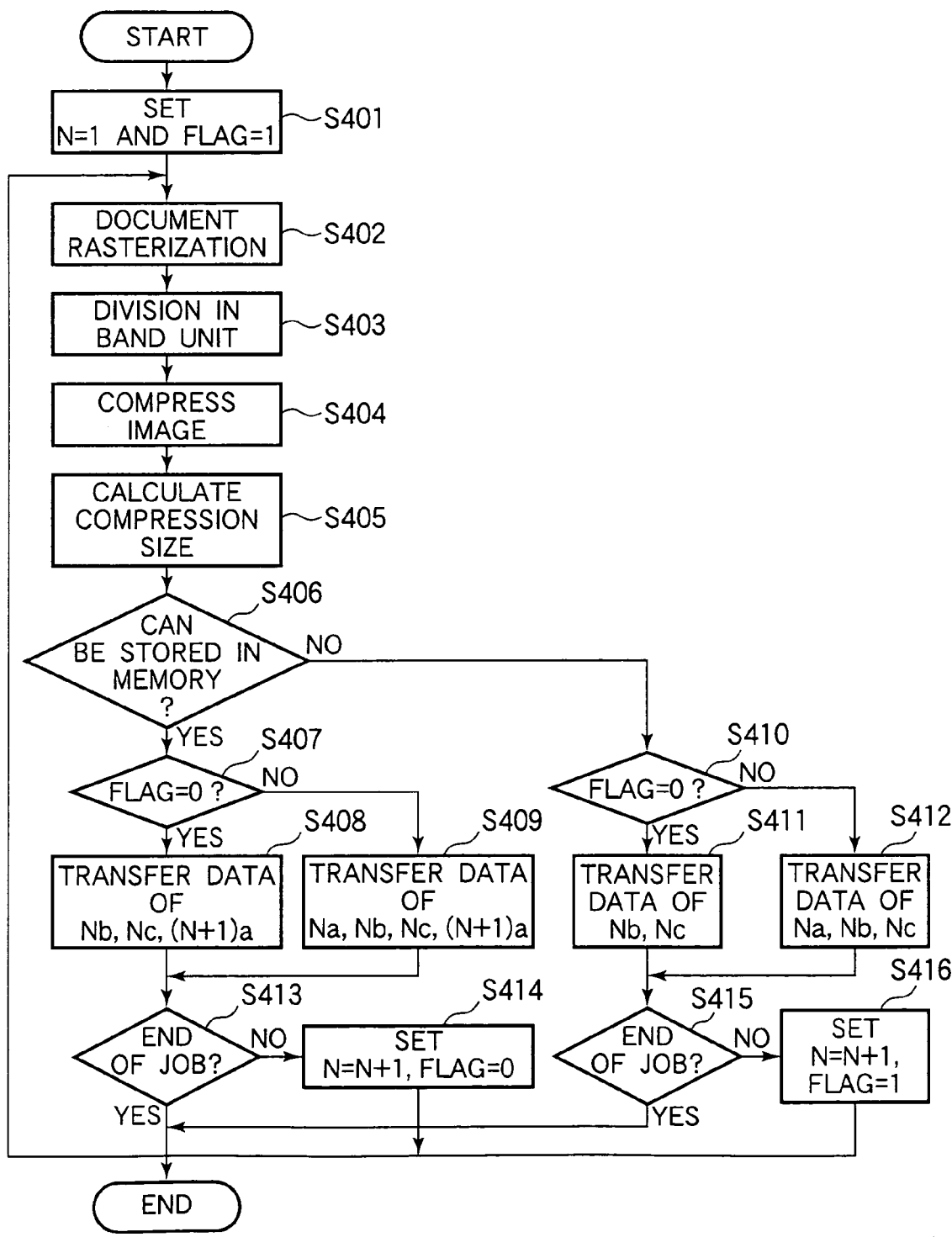
FIG. 4 is a flowchart of the printing process in the host computer 101.
Figure 8A:
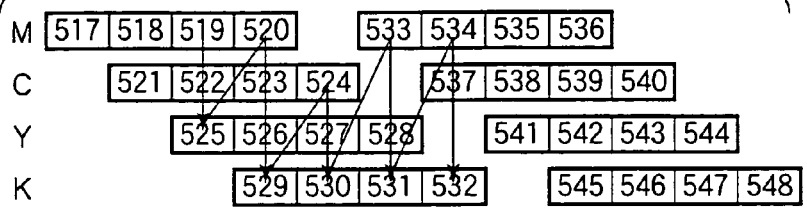
FIG. 8A shows the concept of the order in which the data is transferred in S408.
Figure 8B:
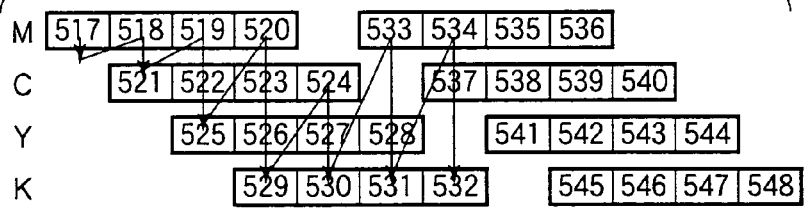
FIG. 8B shows the concept of the order in which the data is transferred in S409.
Figure 8C:
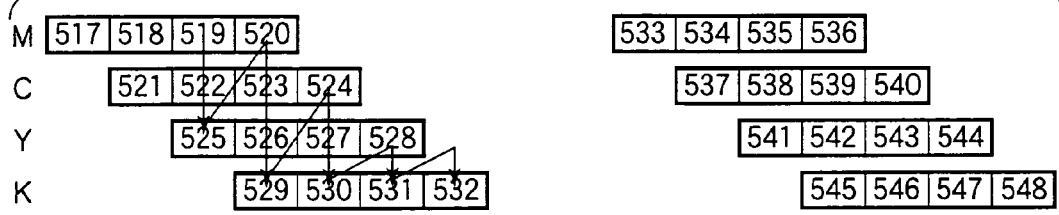
FIG. 8C shows the concept of the order in which the data is transferred in S411.
Figure 8D:
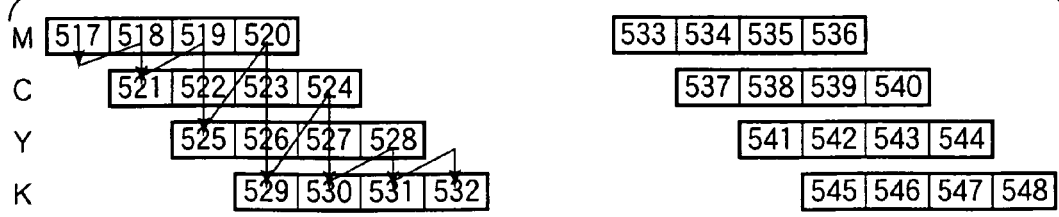
FIG. 8D shows the concept of the order in which the data is transferred in S412.

An example of the process performed by the host computer 101 is described below concretely by referring to the flowchart shown in FIG. 4. FIG. 4 is a flowchart showing the process performed when data is transferred from the host computer 101 to a printer. First, in S401, N=1, and Flag=1 are set. N indicates the order of the page. The "Flag" is described later. In S402, document data to be printed is converted into image data. Document data is written in the page description language. In S403, the image data is divided in a band unit for transfer to the MCYK color printer controller 103.

FIG. 5 shows the concept of dividing image data to be printed in a band unit. Reference numerals 501 to 548 denotes pieces of image data to be transmitted from the host computer 101 to the printer controller 103 in a band unit of MCYK color. Reference numerals 501 to 516 denote the data on the N-th page. Reference numerals 517 to 532 denote the data on the (N+1)th page. Reference numeral 533 to 548 denote the data on the (N+2)th page.

FIG. 6 shows the concept of the order in which the data divided in a band unit is printed. The horizontal axis shown in FIG. 6 indicates the time direction in which the printing process is performed, and the MCYK colors are shifted by the delay among the drums. When a plurality of pages are printed on the laser beam color printer of the 4-drum system, the printing on the (N+1)th page starts before the printing on the N-th page is completed, and the printing on the N-th page partially overlaps the printing on the (N+1)th page.

In S404, variable-length image compression is performed on the image data divided in a band unit. The image compression can be realized by the JPEG, the JBIG, etc., but is not limited specifically.

In S405, the compressed data size is calculated. FIG. 7 shows an example of the area calculated in S405. FIG. 7 shows the concept of dividing image data divided in a band unit into areas. When the N-th page is printed, the overlapping area with the (N−1)th page is defined as Na, the overlapping area with the (N+1)th page is defined as Nc, and a non-overlapping area is defined as Nb. The similar definitions are performed on and after the (N+1)th page. In S405, the compressed data size DNa, DNb, DNc, D(N+1)a, D(N+1)b, D(N+1)c respectively of Na, Nb, Nc, (N+1)a, (N+1)b, (N+1)c are calculated.

In S406, it is determined whether or not the data on the N-th page and the (N+1)th page can be stored in the DRAM 304 of the printer controller 103 when the data on the N-th page and the data on the (N+1)th page are transferred with overlapping timing in the order in which the data is printed. Assuming that the buffer capacity of the DRAM 304 is M, and at least data of 1 page can be stored.

$$DNa+DNb+DNc+D(N+1)a<M$$

To satisfy the expression above means that the data on the N-th page can be stored in the memory although the data in the (N+1)a area is transferred when the data on the N-th page is transferred.

$$D(N+1)a+D(N+1)b+D(N+1)c+DNc<M$$

To satisfy the expression above means that the data on the (N+1)th page can be stored in the memory although the data in the Nc area is transferred when the data on the (N+1)th page is transferred.

When the two expressions above are satisfied, the data on the N-th page and the data on the (N+1)th page can be transferred with overlapping timing. If the two expressions above are not satisfied, the data on the (N+1)th page is transferred after completely transferring the data on the N-th page.

If YES at the branch in S406, then it is determined in S407 whether or not the data in the Na area has already been transferred. A "Flag" is explained here. A "Flag" indicates whether or not the data in the overlapping area between the N-th page and the (N−1)th page, that is, the data in the Na area, has already been transferred. If it has already been transferred, then Flag=0. If it has not been transferred yet, Flag=1. When N=1, there is no (N−1)th page. Since the data in the Na area has not naturally been transferred yet, Flag=1.

When YES at the branch in S407, the data in the Na area has already been transferred. Therefore, the remaining data in the Nb and Nc areas on the N-th page, and the data in the (N+1)a area on the (N+1)th page are transferred in S408 to the printer controller in a band unit in the order in which the data is printed.

When NO at the branch in S407, the data in the Na area has not been transferred. Therefore, the data on the N-th page and the data in the (N+1)a area on the (N+1)th page are transferred in S409 in the order in which the data is printed. Then, in S413, it is determined whether or not the data on all page has been completely transferred. If it has not been completely transferred yet, then N=N+1 and Flag=0 are set in S414, control is returned to S402, and the process is performed up to the end of the job.

If NO at the branch in S406, then it is determined in S410 whether or not the data in the Na area has already been transferred. If Flag=0, then the data in the Nb and NC areas is transferred in S411 to the printer controller in a band unit in the order in which the data is printed. If Flag=1, the data in the Na, Nb, and Nc areas is transferred in S412 in the order in which the data is printed. Then, in S415, it is determined whether or not the data on all pages has been completely transferred. If not, N=N+1 and Flag=1 are set in S416, control is returned to S402, and the process is performed up to the end of the job.

FIG. 8 shows an example of the order in which the data is transferred. FIG. 8A shows the concept of the order in which the data is transferred in S408. FIG. 8A shows that the data is transferred in the order indicated by the arrow. FIGS. 8B, 8C, and 8D respectively show the concept of the order in which the data is transferred in S409, S411, and S412. For example, in FIG. 8A, the data 519, 522, 525, 520, 523, . . . , 531, 534, 537, and 532 are transferred in this order.

Figure 9A:
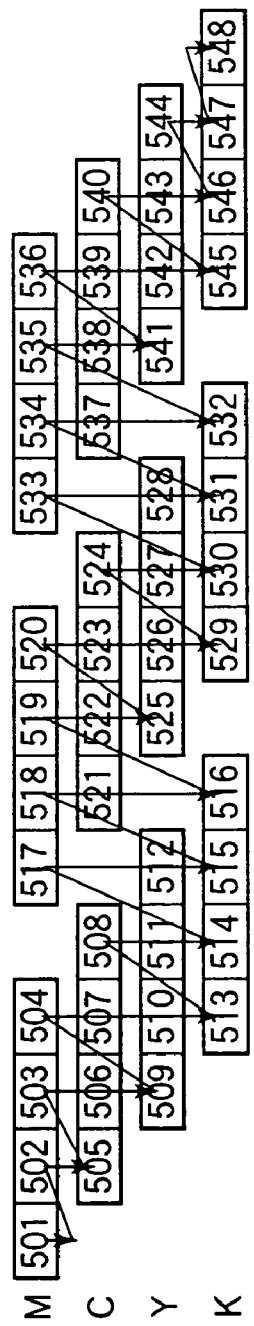
FIG. 9A shows the concept of the order in which the data is transferred when "YES" is repeated at the branch in S406 shown in FIG. 4.

FIG. 9A shows the concept of the order in which the data is transferred when "YES" is repeated at the branch in S406 shown in FIG. 4. If the data of 1 page can be stored in the memory although the data on the N-th page and the data on the (N+1)th page are transferred with overlapping timing in the order in which the data is printed, then the data on the N-th page and the data on the (N+1)th page can be transferred with overlapping timing, and the printing on the (N+1)th page can be started before the printing on the N-th page is completed, thereby realizing high-speed printing.

Figure 9B:
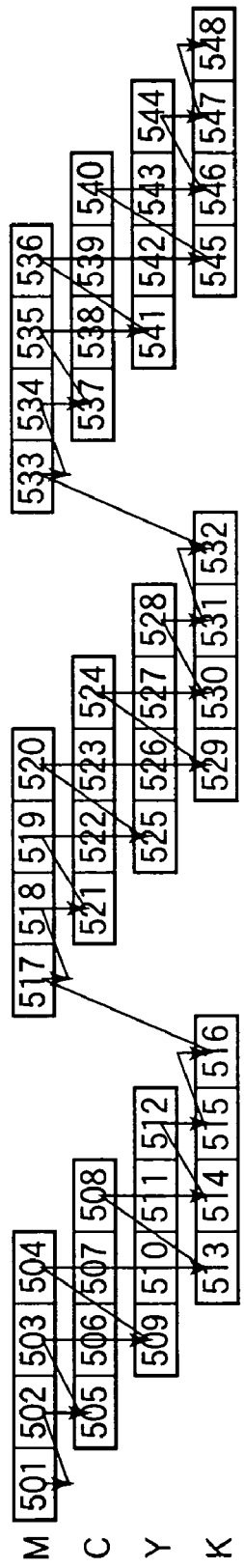
FIG. 9B shows the concept of the order in which the data is transferred when "NO" is repeated at the branch in S406 shown in FIG. 4.

FIG. 9B shows the concept of the order in which the data is transferred when "NO" is repeated at the branch in S406 shown in FIG. 4. If the data of 1 page cannot be stored in the memory when the data on the N-th page and the data on the (N+1)th page are transferred with overlapping timing in the order in which the data is printed, then the data on the (N+1)th page is transferred after the data on the N-th page has been completely transferred. Therefore, for example, the printing can be performed without a faulty printing result although the data transfer speed from the host computer is slow relative to the printing speed.

Figure 10:
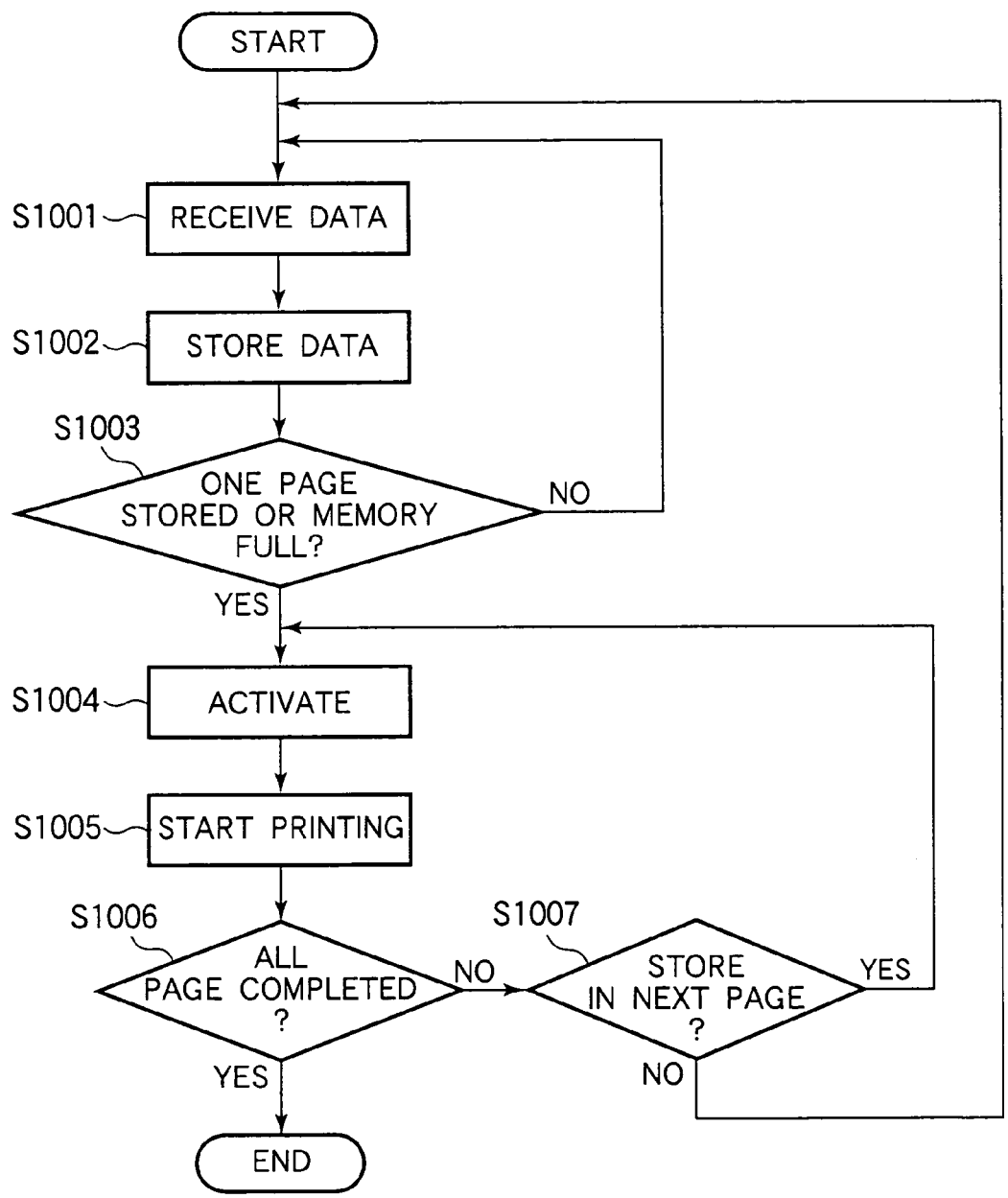
FIG. 10 is a flowchart of the printing process performed by the printer controller 103.

An example of the process performed by the printer controller 103 is practically explained below by referring to the flowchart shown in FIG. 10. FIG. 10 is a flowchart of the printing process performed by the printer controller 103.

First, in step S1001, drawing source data is received from a data source such as the host computer 101, etc. The drawing source data can be practically coded data unique to printer equipment, image compressed data of an image, etc.

In step S1002, the received data is stored in the DRAM 304. Normally, to absorb the difference between the communications speed of the interface and the data processing speed, the data is temporarily buffered in a memory area in the DRAM 304 referred to as a buffer. The current operation to be performed is the buffering. A page of the received data from the host computer 101 is divided in a band unit for each color, and is transferred in a band unit in the order in which the data is output at the printer.

As shown in FIGS. 9A and 9B, the DRAM 304 sequentially stores the pieces of the data 501, 502, 505, 503, 506, . . . in the order in which the data is transferred, and is discarded in a band unit after the printing. At this time, the data stored in a band unit is managed using a table with the leading address of the stored data and the data size stored by color. In step S1003, it is determined whether the data of 1 page has been stored or the memory is full of data.

If YES at the branch in S1003, the decoder 305 and the smoothing 306 are set in a printable state, and the printer engine 104 is activated in step S1004. In step S1005, the printing is performed. On the image compressed data stored in the DRAM 304, the decoder 305 processes the drawing data in each color corresponding to the next printing position through the memory controller 303. The drawing data is processed in a band unit. When the data of one band is printed, the buffered data is discarded, and the data in the next band is processed by referring to the data storage table. In step S1006, it is determined whether or not the printing has been completed on all pages. If it has not been completed on all pages, then control is passed to step S1007.

In step S1007, it is determined whether or not the data on the next page has been stored. If YES, then control is passed to step S1004. If NOT, then control is passed to step S1001.

Other Embodiments

In the above-mentioned embodiment, each processing unit can actually be realized by software although the hardware configuring a network is included. That is, it is obvious that the objective of the present invention can also be attained by providing a storage medium (or a recording medium) storing a program code of the software which realizes the function of the above-mentioned embodiment for a system or an apparatus, and reading and executing the program code stored in the storage medium by the computer (or the CPU or the MPU) of the system or the apparatus. In this case, the program code itself read from the storage medium realizes the function of the above-mentioned embodiment, and the storage medium storing the program code configures the present invention.

Furthermore, it is also obvious that the present invention not only includes the case in which the function of the above-mentioned embodiment is realized by executing the program code read by the computer, but also includes the case in which the function of the above-mentioned embodiment is realized by the process of performing all or a part of the actual process by the operating system (OS), etc. operating in the computer at an instruction of the program code.

In addition, it is also obvious that the present invention also includes the case in which the function of the above-mentioned embodiment is realized by the process of writing the program code read from the storage medium to the memory of a feature expansion card inserted into the computer or a feature expansion unit connected to the computer, and then performing all or a part of the actual process by the CPU, etc. provided for the feature expansion card or the feature expansion unit at an instruction of the program code.

In the embodiment above, each piece of data of the YMCK is transferred in a band unit while shifting the leading position in accordance with the distance among the drums in the order in which the data is printed. Therefore, it is not necessary to divide the buffer memory at the printer side by color of the YMCK, and the buffer memory can be efficiently used without waste, thereby reducing the requirements of the memory.

Since the order in which the data is transferred is changed depending on whether or not the data of 1 page can be stored on the memory of a printer, the buffer memory in the printer controller can be reduced to the smallest possible requirements of the printing page. Furthermore, for example, the printing can be performed without a faulty printing result although the data transfer speed from the host computer is slow relative to the printing speed, or when the variable length compression is performed on the transfer data and the compression rate is not desired.

In the embodiment above, a laser beam color printer of the 4-drum system is explained for example, but the present invention is not limited to this type of printer, but can be applied to any image forming apparatus provided with a plurality of image forming units arranged at predetermined intervals.

As many apparently widely different embodiments of the present invention can be made without departing from the spirit and scope thereof, it is to be understood that the invention is not limited to the specific embodiments thereof except as defined in the appended claims.

As described above, according to the present invention, document data is converted into image data and the image data is transferred in order in which the data is printed in accordance with the delay among the image forming units of an external image forming apparatus. Therefore, the memory requirements of the image forming apparatus can be reduced, thereby forming an image at a higher speed.

What is claimed is:

1. An information processing apparatus for transmitting data to an image forming apparatus, wherein the data is divided in a band unit in each of a plurality of colors, including first to fourth colors, in registration with a position of an image forming section of the image forming apparatus for each color, in which when an N-th page is printed, areas on the N-th page overlapping an (N−1)th page, overlapping an (N+1)th page, and overlapping no page, are defined as Na, Nc, and Nb, respectively, and the areas on the (N+1)th page overlapping the N-th page, overlapping an (N+2)th page, and overlapping no page are defined as (N+1)a, (N+1)c, and (N+1)b, respectively, said information processing apparatus comprising:

a conversion unit configured to convert document data into image data;

a division unit configured to divide the image data converted by said conversion unit in a band unit;

a compression unit configured to compress the image data divided by said division unit;

a calculation unit configured to calculate a size of the image data compressed by said compression unit;

a first discrimination unit configured to discriminate, based on the size of the compressed image data calculated by said calculation unit, whether both of first and second conditions are met, wherein the first condition requires that the size of the compressed image data of the areas Na, Nb, Nc, and (N+1)a is smaller than a buffer size of a buffer memory provided in the image forming apparatus and the second condition requires that the size of the compressed image data of the areas (N+1)a, (N+1)b, (N+1)c, and Nc is smaller than the buffer size;

a second discrimination unit configured to discriminate whether data in the area Na has been transmitted to the image forming apparatus; and a transmission unit configured to transmit data to the image forming apparatus, wherein said transmission unit transmits data of the first to the fourth colors in the area Nb and data of the third and the fourth colors in the area Nc on the N-th page and data of the first and second colors in the area (N+1)a on the (N+1)th page to the image forming apparatus, if said first discrimination unit discriminates that both of the first and second conditions are met and if said second discrimination unit discriminates that the data in the area Na has been transmitted to the image forming apparatus, wherein said transmission unit transmits data of the first and the second colors in the area Na, data of the first to the fourth colors in the area Nb and data of the third and the fourth colors in the area Nc on the N-th page and data of the first and the second colors in the area (N+1)a on the (N+1)th page to the image forming apparatus, if said first discrimination unit discriminates that both of the first and second conditions are met and if said second discrimination unit discriminates that the data in the area Na has not been transmitted to the image forming apparatus, wherein said transmission unit transmits data of the first to the fourth colors in the area Nb and data of the third and the fourth colors in the area Nc on the N-th page to the image forming apparatus, if said first discrimination unit discriminates that either of the first and second conditions are not met and if said second discrimination unit discriminates that the data in the area Na has been transmitted to the image forming apparatus, and wherein said transmission unit transmits data of the first and the second colors in the area Na, data of the first to the fourth colors in the area Nb and data of the third and the fourth colors in the area Nc on the N-th page to the image forming apparatus, if said first discrimination unit discriminates that either of the first and second conditions are not met and if said second discrimination unit discriminates that the data in the area Na has not been transmitted to the image forming apparatus.

2. An information processing method for use in transmitting data to an image forming apparatus, wherein the data is divided in a band unit in each of a plurality of colors, including first to fourth colors, in registration with a position of an image forming section of the image forming apparatus for each color, in which when an N-th page is printed, areas on the N-th page overlapping an (N−1)th page, overlapping an (N+1)th page, and overlapping no page, are defined as Na, Nc, and Nb, respectively, and the areas on the (N+1)th page overlapping the N-th page, overlapping an (N+2)th page, and overlapping no page are defined as (N+1)a, (N+1)c, and (N+1)b, respectively, said information processing method comprising:

a conversion step for converting document data into image data;

a division step for dividing the image data converted by said conversion unit in a band step;

a compression step for compressing the image data divided by said division step;

a calculation step for calculating a size of the image data compressed by said compression step;

a first discrimination step of discriminating, based on the calculated size of the image data from said calculation step, whether both of first and second conditions are met, wherein the first condition requires that the size of the compressed image data of the areas Na, Nb, Nc, and (N+1)a is smaller than a buffer size of a buffer memory provided in the image forming apparatus and the second condition requires that the size of the compressed image data of the areas (N+1)a, (N+1)b, (N+1)c, and Nc is smaller than a buffer size;

a second discrimination step of discriminating whether data in the area Na has been transmitted to the image forming apparatus; and a transmission step of transmitting data to the image forming apparatus, wherein said transmission step transmits data of the first to the fourth colors in the area Nb and data of the third and the fourth colors in the area Nc on the N-th page and data of the first and second colors in the area (N+1)a on the (N+1)th page to the image forming apparatus, if said first discrimination step discriminates that both of the first and second conditions are met and if said second discrimination step discriminates that the data in the area Na has been transmitted to the image forming apparatus, wherein said transmission step transmits data of the first and the second colors in the area Na, data of the first to the fourth colors in the area Nb and data of the third and the fourth colors in the area Nc on the N-th page and data of the first and second colors in the area (N+1)a on the (N+1)th page to the image forming apparatus, if said first discrimination step discriminates that both of the first and second conditions are met and if said second discrimination step discriminates that the data in the area Na has not been transmitted to the image forming apparatus, wherein said transmission step transmits data of the first to the fourth colors in the area Nb and data of the third and the fourth colors in the area Nc on the N-th page to the image forming apparatus, if said first discrimination step discriminates either of the first and second conditions are not met and if said second discrimination step discriminates that the data in the area Na has been transmitted to the image forming apparatus, and wherein said transmission step transmits data of the first and the second colors in the area Na, data of the first to the fourth colors in the area Nb and data of the third and the fourth colors in the area Nc on the N-th page to the image forming apparatus, if said first discrimination step discriminates that either of the first and second conditions are not met and if said second discrimination step discriminates that the data in the area Na has not been transmitted to the image forming apparatus.

3. A computer-readable storage medium storing an information processing program for controlling a computer to transmit data to an image forming apparatus, wherein the data is divided in a band unit in each of a plurality of colors, including first to fourth colors, in registration with a position of an image forming section for each color, in which when an N-th page is printed, areas on the N-th page overlapping an (N−1)th page, an overlapping (N+1)th page, and overlapping no page, are defined as Na, Nc, and Nb, respectively, and the areas on the (N+1)th page overlapping the N-th page, overlapping an (N+2)th page, and overlapping no page are defined as (N+1)a, (N+1)c, and (N+1)b, respectively, said information processing program comprising:

a conversion step for converting document data into image data;

a division step for dividing the image data converted by said conversion unit in a band step;

a compression step for compressing the image data divided by said division step;

a calculation step for calculating a size of the image data compressed by said compression step;

a first discrimination step of discriminating, based on the calculated size of the image data from said calculation step, whether both of first and second conditions are met, wherein the first condition requires that the size of the compressed image data of the areas Na, Nb, Nc, and (N+1)a is smaller than a buffer size of a buffer memory provided in the image forming apparatus and the second condition requires that the size of the compressed image data of the areas (N+1)a, (N+1)b, (N+1)c, and Nc is smaller than a buffer size;

a second discrimination step of discriminating whether data in the area Na has been transmitted to the image forming apparatus; and a transmission step of transmitting data to the image forming apparatus, wherein said transmission step transmits data of the first to the fourth colors in the area Nb and data of the third and the fourth colors in the area Nc on the N-th page and data of the first and second colors in the area (N+1)a on the (N+1)th page to the image forming apparatus, if said first discrimination step discriminates that both of the first and second conditions are met and if said second discrimination step discriminates that the data in the area Na has been transmitted to the image forming apparatus, wherein said transmission step transmits data of the first and the second colors in the area Na, data of the first to the fourth colors in the area Nb and data of the third and the fourth colors in the area Nc on the N-th page and data of the first and second colors in the area (N+1)a on the (N+1)th page to the image forming apparatus, if said first discrimination step discriminates that both of the first and second conditions are met and if said second discrimination step discriminates that the data in the area Na has not been transmitted to the image forming apparatus, wherein said transmission step transmits data of the first to the fourth colors in the area Nb and data of the third and the fourth colors in the area Nc on the N-th page to the image forming apparatus, if said first discrimination step discriminates either of the first and second conditions are not met and if said second discrimination step discriminates that the data in the area Na has been transmitted to the image forming apparatus, and wherein said transmission step transmits data of the first and the second colors in the area Na, data of the first to the fourth colors in the area Nb and data of the third and the fourth colors in the area Nc on the N-th page to the image forming apparatus, if said first discrimination step discriminates that either of the first and second conditions are not met and if said second discrimination step discriminates that the data in the area Na has not been transmitted to the image forming apparatus.

4. An information processing apparatus for transmitting data to an image forming apparatus, wherein the data is divided in a band unit in each of a plurality of colors, including first to fourth colors, in registration with a position of an image forming section of the image forming apparatus for each color, said information processing apparatus comprising:

a conversion unit configured to convert document data into image data;

a division unit configured to divide the image data converted by said conversion unit in a band unit;

a compression unit configured to compress the image data divided by said division unit;

a calculation unit configured to calculate a size of the image data compressed by said compression unit;

a discrimination unit configured to discriminate, based on the size of the compressed image data calculated by said calculation unit, whether both of first and second conditions are met, wherein the first condition requires that the size of the compressed image data of an N-th page and a portion of the compressed image data of an (N+1)th page is smaller than a buffer size of a buffer memory provided in the image forming apparatus and the second condition requires that the size of the compressed image data of the (N+1)th page and a portion of the compressed image data of the N-th page is smaller than the buffer size; and a transmission unit configured to transmit data to the image forming apparatus, wherein said transmission unit transmits data of the first color of the (N+1)th page to the image forming apparatus after completion of transmission of data of the fourth color of the N-th page, if said discrimination unit discriminates that either of the first and second conditions are not met, and wherein said transmission unit transmits data of the first color of the (N+1)th page to the image forming apparatus before completion of transmission of data of the fourth color of the N-th page, if said discrimination unit discriminates both of the first and second conditions are met.

5. An information processing method for use in transmitting data to an image forming apparatus, wherein the data is divided in a band unit in each of a plurality of colors, including first to fourth colors, in registration with a position of an image forming section for each color, said information processing method comprising:

a conversion step configured to convert document data into image data;

a division step configured to divide the image data converted by said conversion unit in a band unit;

a compression step configured to compress the image data divided by said division unit;

a calculation step configured to calculate a size of the image data compressed by said compression unit;

a discrimination step of discriminating, based on the size of the compressed image data calculated by said calculation step, whether both of first and second conditions are met, wherein the first condition requires that the size of compressed image data of an N-th page and a portion of the compressed image data of an (N+1)th page is smaller than a buffer size of a buffer memory provided in the image forming apparatus and the second condition requires that the size of the compressed image data of the (N+1)th page and a portion of the compressed image data of the N-th page is smaller than the buffer size; and a transmission step of transmitting data to the image forming apparatus, wherein said transmission step transmits data of the first color of the (N+1)th page to the image forming apparatus after completion of transmission of data of the fourth color of the N-th page, if said discrimination step discriminates that either of the first and second conditions are not met, and wherein said transmission step transmits data of the first color of the (N+1)th page to the image forming apparatus before completion of transmission of data of the fourth color of the N-th page, if said discrimination step discriminates that both of the first and second conditions are met.

6. A computer-readable storage medium storing an information processing program for controlling a computer to transmit data to an image forming apparatus, wherein the data is divided in a band unit in each of a plurality of colors, including first to fourth colors, in registration with a position of an image forming section for each color, said information processing program comprising:

a conversion step configured to convert document data into image data;

a division step configured to divide the image data convened by said conversion unit in a band unit;

a compression step configured to compress the image data divided by said division unit;

a calculation step configured to calculate a size of the image data compressed by said compression unit;

a discrimination step of discriminating, based on the size of the compressed image data calculated by said calculation step, whether both of first and second conditions are met, wherein the first condition requires that the size of compressed image data of an N-th page and a portion of the compressed image data of an (N+1)th page is smaller than a buffer size of a buffer memory provided in the image forming apparatus and the second condition requires that the size of the compressed image data of the (N+1)th page and a portion of the compressed image data of the N-th page is smaller than the buffer size; and a transmission step of transmitting data to the image forming apparatus, wherein said transmission step transmits data of the first color of the (N+1)th page to the image forming apparatus after completion of transmission of data of the fourth color of the N-th page, if said discrimination step discriminates that either of the first and second conditions are not met, and wherein said transmission step transmits data of the first color of the (N+1)th page to the image forming apparatus before completion of transmission of data of the fourth color of the N-th page, if said discrimination step discriminates that both of the first and second conditions are met.

7. An information processing apparatus for transmitting data to an image forming apparatus which forms an image in a sequential order of first to fourth colors, said information processing apparatus comprising:
- a discrimination unit configured to discriminate whether both of first and second conditions are met, wherein the first condition requires that the size of data of an N-th page and a portion of an (N+1)th page is smaller than a buffer size of a buffer memory provided in the image forming apparatus and the second condition requires that the size of data of an (N+1)th page and a portion of an Nth page is smaller than a buffer size; and
- a transmission unit configured to transmit data to the image forming apparatus,
- wherein said transmission unit transmits data of the first color of the (N+1)th page to the image forming apparatus after completion of transmission of data of the fourth color of the N-th page, if said discrimination unit discriminates that either of the first and second conditions are not met, and
- wherein said transmission unit transmits data of the first color of the (N+1)th page to the image forming apparatus before completion of transmission of data of the fourth color of the N-th page, if said discrimination unit discriminates that both of the first and second conditions are met.

8. An information processing method for use in transmitting data to an image forming apparatus which forms an image in a sequential order of first to fourth colors, said information processing method comprising:
- a discrimination step for discriminating whether both of first and second conditions are met, wherein the first condition requires that the size of data of an N-th page and a portion of an (N+1)th page is smaller than a buffer size of a buffer memory provided in the image forming apparatus and the second condition requires that the size of data of an (N+1)th page and a portion of an N-th page is smaller than the buffer size; and
- a transmission step for transmitting data to the image forming apparatus,
- wherein said transmission step transmits data of the first color of the (N+1)th page to the image forming apparatus after completion of transmission of data of the fourth color of the N-th page, if said discrimination step discriminates that either of the first and second conditions are not met, and
- wherein said transmission step transmits data of the first color of the (N+1)th page to the image forming apparatus before completion of transmission of data of the fourth color of the N-th page, if said discrimination step discriminates that both of the first and second conditions are met.

9. A computer-readable storage medium for storing an information processing program for transmitting data to an image forming apparatus which forms an image in a sequential order of first to fourth colors, said information processing program comprising:
- a discrimination step for discriminating whether both of first and second conditions are met, wherein the first condition requires that the size of data of an N-th page and a portion of an (N+1)th page is smaller than a buffer size of a buffer memory provided in the image forming apparatus and the second condition requires that the size of data of an (N+1)th page and a portion of an N-th page is smaller than the buffer size; and
- a transmission step for transmitting data to the image forming apparatus,
- wherein said transmission step transmits data of the first color of the (N+1)th page to the image forming apparatus after completion of transmission of data of the fourth color of the N-th page, if said discrimination step discriminates that either of the first and second conditions are not met, and
- wherein said transmission step transmits data of the first color of the (N+1)th page to the image forming apparatus before completion of transmission of data of the fourth color of the N-th page, if said discrimination step discriminates that both of the first and second conditions are met.

* * * * *